United States Patent [19]

Dickson

[11] 4,106,648
[45] Aug. 15, 1978

[54] BARREL CART AND STAND

[76] Inventor: Richard E. Dickson, Box 517, Tribune, Kans. 67879

[21] Appl. No.: 801,166

[22] Filed: May 27, 1977

[51] Int. Cl.² ............................................ B62B 1/06
[52] U.S. Cl. .................................. 214/372; 214/380; 280/47.24
[58] Field of Search ..................... 280/47.24; 214/653, 214/654, 372, 377, 378, 379, 380, 381, 382, 383

[56] References Cited

U.S. PATENT DOCUMENTS

| | | | |
|---|---|---|---|
| 436,619 | 9/1890 | Weathers | 280/47.24 X |
| 2,447,300 | 8/1948 | Williams | 214/383 X |
| 2,673,654 | 3/1954 | Kaufman | 214/377 |
| 2,779,492 | 1/1957 | Lapham | 214/383 |
| 2,779,494 | 1/1957 | Kikuchi | 214/377 X |

Primary Examiner—Joseph F. Peters, Jr.
Assistant Examiner—R. Schrecengost
Attorney, Agent, or Firm—John H. Widdowson; Edwin H. Crabtree

[57] ABSTRACT

A barrel cart for engaging a barrel in an upright vertical position, transporting the barrel and lowering the barrel on its side in a horizontal position so that the contents of the barrel may be removed. The barrel cart and a stand may be used for supporting the barrel in the horizontal position.

5 Claims, 9 Drawing Figures

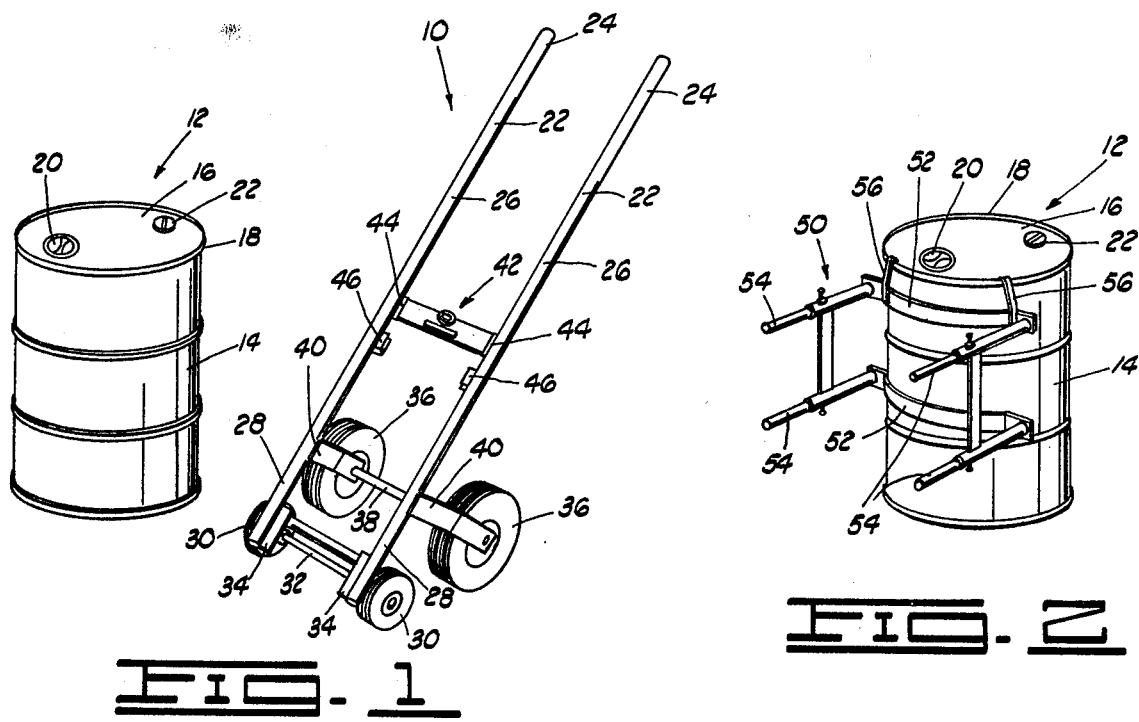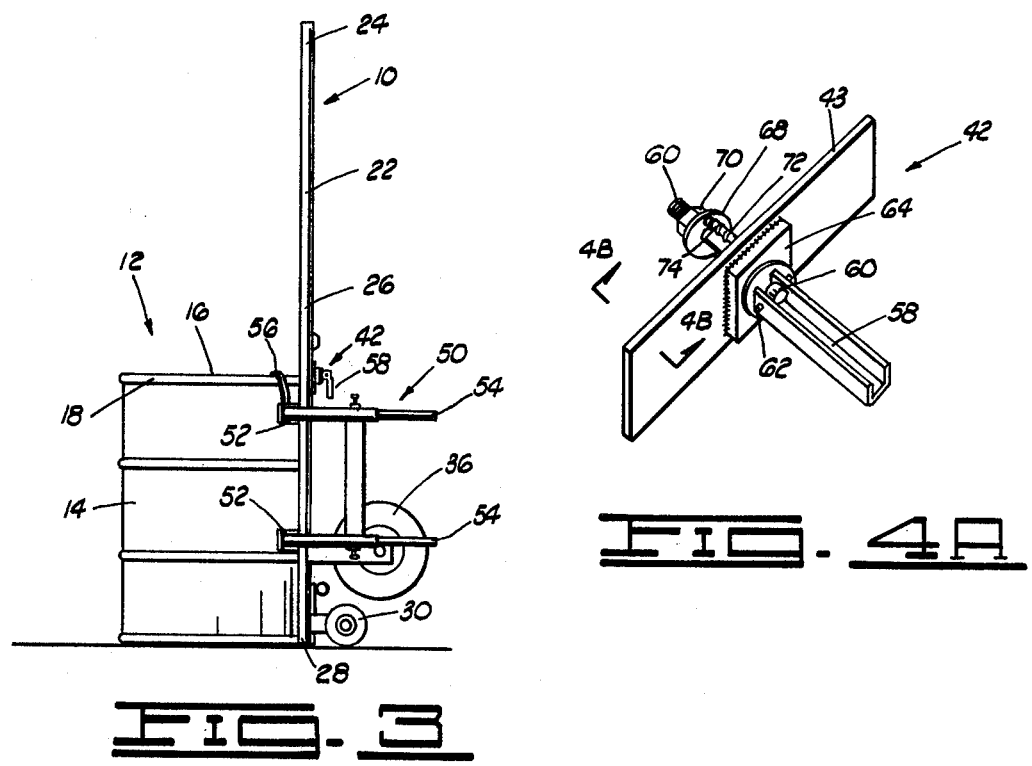

U.S. Patent  Aug. 15, 1978  Sheet 2 of 2  4,106,648
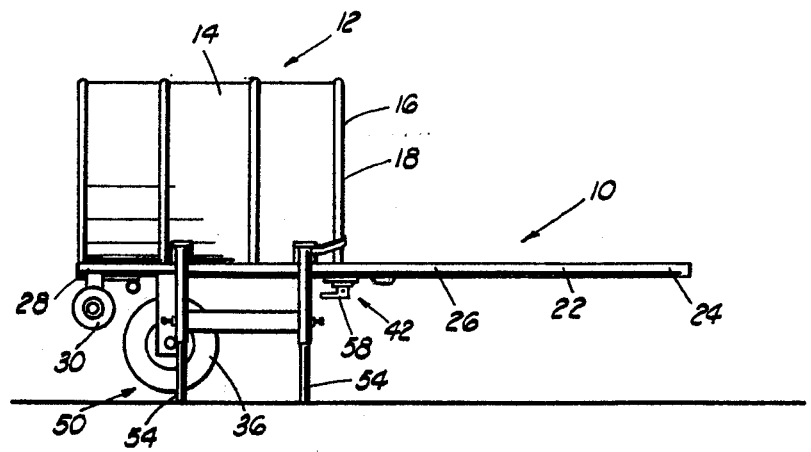
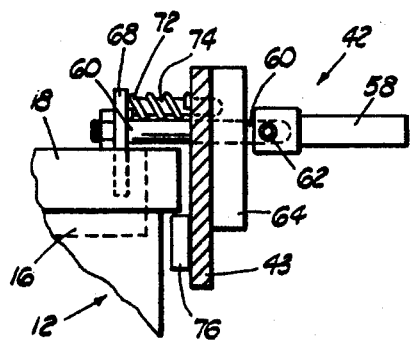
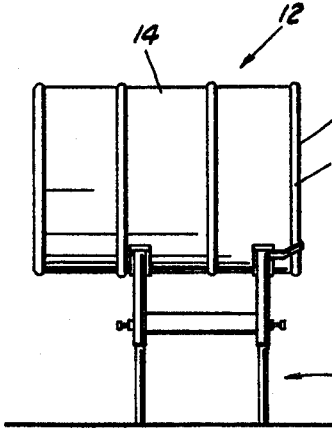
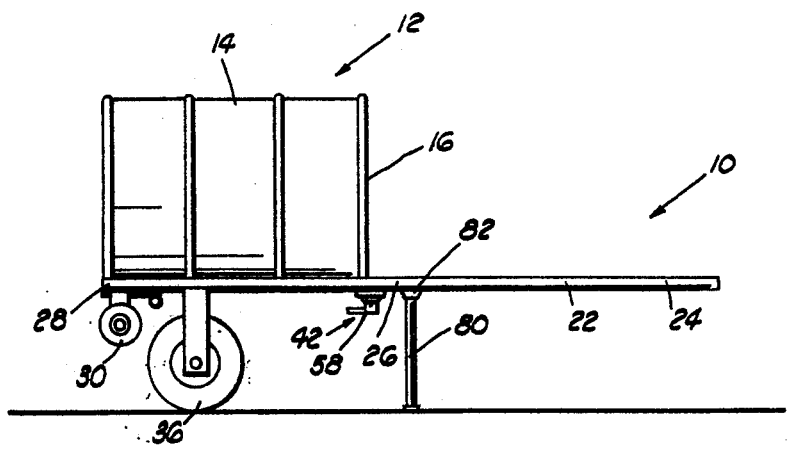

BARREL CART AND STAND

BACKGROUND OF THE INVENTION

This invention relates generally to equipment for handling barrels, drums, or the like, and more particularly, but not by way of limitation, to a barrel cart for engaging the side of a barrel in an upright vertical position, transporting the barrel and lowering it to a horizontal position.

Heretofore, there have been various types of barrel trucks, barrel racks, and carts used for transporting barrels and lowering the barrels into a horizontal position for removing the contents therein. In particular, U.S. Pat. No. 1,738,096 to Cole discloses a barrel truck having an annular shaped pivotally mounted hoop for engaging the top of a barrel and a plurality of wheels mounted on the truck for transporting the barrel and lowering the barrel into a horizontal position. In U.S. Pat. No. 436,619 to Weathers, a combined barrel rack and truck are disclosed wherein the barrel rack includes a rectangular frame with legs thereon for supporting a barrel in a horizontal position.

None of the above described barrel trucks or carts disclose the novel structure of the subject invention for engaging the side of a barrel and lowering the barrel into a horizontal position.

SUMMARY OF THE INVENTION

The subject invention provides a combination of a barrel cart and a barrel stand for quickly engaging a rim around the top of a barrel, transporting the barrel and lowering the barrel into a horizontal position for removing the contents from the barrel. The barrel cart and stand may be used for supporting the barrel in a horizontal position while the contents are removed.

The barrel cart is constructed so that various sizes and shapes of barrels, drums, or the like may be engaged by the cart so that the barrel may be transported and lowered thereon.

The barrel cart and stand are simple in design, rugged in construction, and eliminate the need of having to construct individual barrel racks for supporting barrels in a horizontal position.

The cart is designed so that it can be positioned adjacent the length of the barrel in a vertical position. A barrel clamp attached to the barrel cart secures the barrel to the cart with the weight of the barrel supported on the barrel clamp.

Through the use of the barrel clamp, the need of having a platform or fingers extending outwardly from the bottom of the cart for engaging the bottom of the barrel when the barrel is lifted, is eliminated. Because the cart has no platform or fingers as found on a standard cart, the barrel does not need to be tipped to place the cart adjacent the side of the barrel. Also the cart eliminates lifting and manually handling the barrel.

The cart is designed with two pairs of wheels for balancing the barrel on the cart when it is being transported. The four wheels on the cart make it easier to transport the barrel and eliminate the danger of balancing a drum on a standard cart having a single pair of wheels.

The barrel cart is designed to receive the barrel and the barrel stand suspended from the barrel so that when the barrel is lowered into a horizontal position, the cart may be removed from both the stand and barrel, leaving the barrel supported on the cart. In the alternative, the cart may be used without the stand. The cart, when lowering the barrel to a horizontal position, remains attached to the barrel and supports the barrel thereon in this position.

The cart may also be used for attaching to a barrel laying on its side in a horizontal position and lifting the barrel into an upright vertical position.

The barrel cart includes a pair of elongated parallel barrel cart support members having one end attached to a pair of first cart wheels with a second pair of cart wheels attached to the support members and adjacent the first cart wheels. A barrel clamp is attached to a center portion of the support members and disposed therebetween. The clamp is used for engaging the annular rim of the barrel and holding the barrel adjacent the support members and supporting the weight of the barrel thereon. The barrel cart includes a concaved shaped barrel stand frame for receiving a portion of the side of the barrel. The barrel stand includes outwardly extending legs in a spaced relationship for receiving the barrel cart support members therebetween when the barrel stand is suspended from the top of the barrel.

The advantages and objects of the invention will become evident from the following detailed description when read in conjunction with the accompanying drawings which illustrate the preferred embodiments of the invention.

BRIEF DESCRIPTION OF THE DRAWINGS

FIG. 1 is a perspective view of a barrel cart and a barrel.

FIG. 2 is a perspective view of a barrel stand suspended from the top of a barrel.

FIG. 3 is a side view of the cart and stand attached to the barrel with the barrel in an upright vertical position.

FIG. 4A is a perspective view of a barrel clamp.

FIG. 4B is a side sectional view (taken along lines 4B—4B shown in FIG. 4A) of the barrel clamp in an unlocked position and adjacent a portion of the barrel rim on the top of the barrel.

FIG. 4C is a side sectional view of the barrel clamp in a locked position engaging the barrel rim and supporting the barrel rim and barrel thereon.

FIG. 5 illustrates the cart and stand engaging the barrel with the drum in a lowered horizontal position.

FIG. 6 illustrates the stand supporting the barrel on its side in a horizontal position.

FIG. 7 illustrates the cart supporting the barrel on its side in a horizontal position without the use of the stand.

DETAILED DESCRIPTION OF THE DRAWINGS

In FIG. 1, the barrel cart is designated by general reference numeral 10. Positioned next to the cart 10 is a barrel 12 in an upright, vertical position. The barrel 12 includes an annular shaped side 14, a flat top 16 with an upwardly and outwardly extending barrel rim 18. In the top 16 of the barrel 12 is a barrel bung 20 and a vent plug 22. The bung 20 is used for removing the material in the barrel 12.

The cart 10 includes a pair of elongated barrel support members 22 having an upper portion 24 which is used as handles for the cart 10 in transporting the barrel 12. The support members 22 further include a center portion 26 and a lower portion 28. Attached to the lower portion 28 of the support members 22 are a pair of first wheels 30 rotatably mounted on a wheel axle 32 attached to a wheel frame 34. Adjacent the first wheels 30 and disposed between the center portion 26 and lower portion 28 of the support members 22 are an additional pair of second wheels 36. The wheels 36 are rotatably mounted on a wheel axle 38 which is attached to a wheel frame 40. The frame 40 is secured to both of the support members 22.

Disposed between the support members 22 and attached to the center portion 26 of the support members 24 is a barrel clamp 42. The barrel clamp 42 includes a crossbar 43 which is slidably engaged in support brackets 44 attached to the sides of the center portion 26 of the support members 22. The barrel clamp 42 may be removed from the support clamps 44 and slidably received in additional support clamps 46 attached to the sides of the center portion 26 of the support members 22. By adjusting the barrel clamp 42 on the support members 22, various sizes and lengths of barrels may be engaged and attached to the cart 10. While the support brackets 44 and 46 are shown, it should be appreciated that other adjustment means may be used for attaching the ends of crossbar 43 of the barrel clamp 42 along the length of the support members 22.

It should be noted that the cart 10 does not include any outwardly extending platform or fingers attached to the lower portion 28 of the support members 22 for engaging the bottom of the barrel 12 which are used for standard types of barrel carts. The reason why no platform or fingers are required is because the barrel clamp 42 which engages the barrel rim 18 of the barrel 12 also supports the barrel 12 on the cart 10 when it is being transported and raised and lowered from a vertical to a horizontal position.

In FIG. 2, a cart stand 50 is illustrated which may be used in combination with the cart 10 in the handling of the drum 12. The stand 50 includes a concave shaped frame 52. The ends of the frame 52 are attached to outwardly extending legs 54. The stand 50 further includes "J" shaped straps 56 which are attached at one end to the frame 52 with the "J" shaped end portion engaging the barrel rim 18 when the barrel 12 is in an upright, vertical position. The straps 56 suspend the stand 50 adjacent the side 14 of the barrel 12.

It should be noted that the legs 54 on the stand 50 are in a spaced relationship with sufficient width between the legs 54 to receive the support members 24 of the cart 10 therebetween.

If FIG. 3, the cart 10 is illustrated in an upright, vertical position received between the legs 54 of the stand 50 and adjacent the side 14 of the barrel 12. The barrel clamp 42 is shown with a handle 58 in a locked position engaging the barrel 12 to the cart 10 with the frame 52 of the stand 50 disposed between the side 14 of the barrel 12 and the support members 22 of the cart 10. In this position, the cart 10 is pivoted in a clockwise position thereby pivoting the barrel 12 and the stand 50 in a clockwise position until the barrel 12 is balanced on the cart 10 and supported on the first wheels 30 and second wheels 36. The balanced position would be similar to the position shown in the perspective view of the cart 10 in FIG. 1.

In FIG. 4A, an enlarged perspective view of the barrel clamp 42 is illustrated. The barrel clamp 42 includes the handle 58 which is pivotally attached to one end of a bolt 60 by a pivot 62. The bolt 60 extends through an aperture in a mounting bar 64 and the angular shaped crossbar 43. The other end of the bolt 60 is attached to a ring 68 and a threaded nut 70. The ring 68 is biased outwardly from the crossbar 43 by a coil spring 72 disposed around a spring pin 74. The barrel clamp 42 in FIG. 4A is shown in an unlocked position.

In FIG. 4B, a side sectional view of the barrel clamp 42 is illustrated taken along lines 4B—4B shown in FIG. 4A. Also seen in this view is a portion of the barrel 12 with the upwardly and outwardly extending barrel rim 18. The barrel clamp 42 is shown in an unlocked position and disposed on top of and adjacent the side of a portion of the barrel rim 18. Attached to the lower portion of the crossbar 43 is a rim support bar 76.

In FIG. 4C, the barrel clamp 42 is shown in a locked position engaging the barrel 12 thereto for supporting the barrel 12 on the cart 10. By pivoting the handle 58 on the bolt 60, the bolt 60 is rotated outwardly thereby urging the ring 68 against the inner side of the barrel rim 18. The barrel rim 18 is then compressed between the side of the ring 68 and the side of the crossbar 43. The lower edge of the barrel rim 18 is supported on top of the rim support bar 76 which in effect supports the weight of the barrel 12 thereon when the barrel 12 is in an upright position. When the cart 10 is pivoted from the vertical position, the barrel clamp 42 secures the barrel 12 on top of the support members 24 with the weight of the barrel 12 now distributed on top of the support members 24. In FIG. 4C, the spring 72 can be seen compressed between the side of the ring 68 and the crossbar 43 with the spring pin 74 received inside an aperture 78 shown in the dotted lines in the side of the crossbar 43 and the mounting bar 64.

In FIG. 5, the cart 10 and stand 50 are shown attached to the drum 12 with the barrel 12 lowered on its side in a horizontal position. In this view, it can be seen that the legs 54 of the stand 50 are greater in height than the height between the bottom of the wheels 36 and the top of the support members 22. Therefore, in this position, the stand 50 holds the cart 10 above the top of the ground surface. By unlocking the handle 58 of the barrel clamp 42, the cart 10 can be quickly removed from the barrel 12, lowered to the ground surface and wheeled from underneath the stand 50 and the drum 12. In FIG. 6, the cart has been removed and the barrel 12 is supported on the stand 50.

In FIG. 7, the cart 10 is shown without using the stand 50. Should the stand 50 not be used, the cart 10 is attached to the barrel 12 as shown in FIG. 3 and the cart 10 pivots the barrel 12 on its side in a horizontal position. In this position, the cart 10 supports the barrel 12 with the aid of safety legs 80 which are attached to threaded nipples 82 secured to the sides of the center portion 26 of the support members 22. In this position, the contents of the barrel 12 may be removed and when it is desired to return the barrel 12 to its upright, vertical position, the cart 10 is pivoted upwardly in a counterclockwise direction and the safety legs 80 are removed from the support members 22. The barrel 12 is released from the cart 10 by unlocking the barrel clamp 42 from the barrel rim 18.

Changes may be made in the construction and arrangement of the parts or elements of the invention as disclosed herein without departing from the spirit or scope of the invention as defined in the following claims.

I claim:

1. A barrel cart and a barrel stand for supporting a barrel thereon, the barrel having an annular rim around to top thereof, the cart and stand comprising:

a pair of elongated parallel barrel cart support members having an upper portion, a lower portion, and a center portion, the lower portion and the center portion receiving a side of the barrel thereon and therebetween, the upper portion used as cart handles;

a pair of first cart wheels mounted at the end of the lower portion of said support members and a pair of second cart wheels mounted on said support members and disposed adjacent the pair of said first cart wheels;

a barrel clamp attached to the center portion of said support members and disposed therebetween, said clamp engaging the annular rim of the barrel;

a concaved shaped barrel stand frame for receiving a portion of the side of the barrel thereon, said frame having outwardly extending legs in a spaced relationship for receiving said support members therebetween, and straps attached to said frame for suspending the barrel stand from the top of the barrel; and the barrel stand suspended from the top of the barrel when the barrel is in an upright vertical position, the barrel cart received between said legs of the barrel stand and secured to the barrel by said barrel clamp with said barrel stand frame disposed therebetween.

2. A barrel cart for transporting and supporting a barrel thereon, the barrel having an annular rim around the top thereof, the cart comprising:

a pair of elongated parallel barrel support members having an upper portion, a lower portion, and a center portion, the lower portion and center portion receiving a side of the barrel thereon and therebetween, the upper portion used as cart handles;

a pair of first wheels mounted at the end of the lower portion of said support members and a pair of second wheels mounted on said support members and disposed adjacent the pair of said first wheels; and a barrel clamp, said barrel clamp including:
an elongated cross bar, the ends of the cross bar attached to the center portion of said support members, the front of the cross bar receiving a portion of the side of the barrel thereagainst;
an aperture through the center of the cross bar;
a bolt slidably received through the aperture;
a ring attached to one end of the bolt and disposed in front of the cross bar;
a handle pivotally attached to the other end of the bolt and disposed adjacent the back of the cross bar, the handle used for locking and unlocking said barrel clamp;
a rim support bar attached to the front of the cross bar and positioned adjacent and below the ring;
when the barrel is received on the cart, a portion of the annular ring is received between the ring and the front of the cross bar with the lower edge of the rim disposed above the top of the rim support bar, said barrel clamp is locked when the handle is pivoted on the bolt, the bolt is urged rearwardly away from the cross bar urging the ring toward the front of the cross bar and compressing the rim between the cross bar and the ring with the lower edge of the rim resting on top of the rim support bar and supporting the barrel thereon.

3. The cart as described in claim 2 further including a pair of support brackets attached to the sides of the center portion of said support members, the support brackets releasably engaging the ends of the cross bar thereon.

4. The cart as described in claim 3 further including a plurality of support brackets attached along the sides of the center portion of said support members, by selecting a pair of support brackets for releasably engaging the ends of the cross bar, a barrel of a particular length may be secured to the cart.

5. The cart as described in claim 2, further including a spring-biased pin attached to the side of the ring and slidably engaging the cross bar for biasing the ring outwardly away from the front of the cross bar when said barrel clamp is in an unlocked position.

* * * * *